(12) United States Patent
Matsunaga et al.

(10) Patent No.: US 11,976,993 B2
(45) Date of Patent: May 7, 2024

(54) LOOSENING DETECTION STRUCTURE, LOOSENING DETECTION SYSTEM AND METHOD

(71) Applicant: Nippon Telegraph and Telephone Corporation, Tokyo (JP)

(72) Inventors: Eri Matsunaga, Musashino (JP);
Tadashi Minotani, Musashino (JP);
Masahito Nakamura, Musashino (JP);
Masayuki Tsuda, Musashino (JP)

(73) Assignee: Nippon Telegraph and Telephone Corporation, Tokyo (JP)

( * ) Notice: Subject to any disclaimer, the term of this patent is extended or adjusted under 35 U.S.C. 154(b) by 0 days.

(21) Appl. No.: 17/774,670

(22) PCT Filed: Nov. 8, 2019

(86) PCT No.: PCT/JP2019/043797
§ 371 (c)(1),
(2) Date: May 5, 2022

(87) PCT Pub. No.: WO2021/090468
PCT Pub. Date: May 14, 2021

(65) Prior Publication Data
US 2022/0390307 A1   Dec. 8, 2022

(51) Int. Cl.
*G01L 5/24* (2006.01)
*G01L 1/20* (2006.01)
*G01L 1/22* (2006.01)

(52) U.S. Cl.
CPC ............... *G01L 5/243* (2013.01); *G01L 1/20* (2013.01); *G01L 1/2231* (2013.01); *G01L 5/24* (2013.01)

(58) Field of Classification Search
CPC ... G01L 5/24; G01L 5/243; G01L 1/20; G01L 1/2231; G01L 1/2237; G01L 1/25
See application file for complete search history.

(56) References Cited

U.S. PATENT DOCUMENTS

| 4,637,391 A * | 1/1987 | Schlein ............... B23D 61/025 606/178 |
| 2004/0073384 A1* | 4/2004 | Kadner ............... B25B 23/1425 702/41 |

(Continued)

FOREIGN PATENT DOCUMENTS

| JP | S60-39523 A | 3/1985 |
| JP | 2013-210234 A | 10/2013 |
| JP | 2014-228465 A | 12/2014 |

OTHER PUBLICATIONS

Tomotsugu Sakai et al., *Measurement of Bolt Axial Force Using Ultrasonic Waves*, Proceedings of the Japan Society of Mechanical Engineers, vol. 43, No. 366, 1997, pp. 723-728.

*Primary Examiner* — Paul M. West
(74) *Attorney, Agent, or Firm* — Workman Nydegger

(57) ABSTRACT

A loosening detection structure used to detect loosening of a bolt includes a material that is disposed between a fixing subject steel plate and a head portion of a metal bolt for fixing the steel plate and either attached to a seating surface of the head portion of the bolt or attached to a washer disposed between the steel plate and the head portion of the bolt, and that has electrical characteristics that vary in response to variation in a force for fastening the bolt to the steel plate.

3 Claims, 9 Drawing Sheets

(56) References Cited

U.S. PATENT DOCUMENTS

2008/0292427 A1\* 11/2008 Rowe .................... F16B 35/041
                                                              411/339
2014/0190267 A1     7/2014 Mekid et al.
2018/0018481 A1\* 1/2018 Paulson ................. G01K 1/024

\* cited by examiner

FREQUENCY (GHz)
RESONANCE FREQUENCY SPECTRUM

— FIXED STATE
---- LOOSENED STATE

FREQUENCY (GHz)
RESONANCE FREQUENCY SPECTRUM

— FIXED STATE
---- LOOSENED STATE

LOOSENING DETECTION STRUCTURE, LOOSENING DETECTION SYSTEM AND METHOD

TECHNICAL FIELD

The present invention relates to a loosening detection structure, a loosening detection system, and a loosening detection method.

BACKGROUND ART

NPL 1 discloses a method for detecting loosening of a bolt using ultrasonic waves.

CITATION LIST

Non Patent Literature

[NPL 1] Sakai, 2 others, "Measuring the axial force of a bolt using ultrasonic waves", Transactions of the Japan Society of Mechanical Engineers (series 3), volume 43, no. 366, 1997, p. 723-729

SUMMARY OF THE INVENTION

Technical Problem

However, in NPL 1, an inspection subject bolt is specified, whereupon loosening of the bolt is detected, and therefore, in cases where it is difficult to specify the inspection subject bolt, such as a bolt positioned in a location that is difficult to see, the method of NPL 1 cannot be used. Moreover, in NPL 1, ultrasonic waves are used, and therefore inspections are difficult for inexperienced persons.

The present invention has been designed in consideration of the circumstances described above, and an object of the present invention is to provide a technique with which loosening of a bolt can easily be detected.

Means for Solving the Problem

A loosening detection structure according to an aspect of the present invention is a loosening detection structure used to detect loosening of a bolt, the loosening detection structure including a material that is disposed between a fixing subject steel plate and a head portion of a metal bolt for fixing the steel plate and either attached to a seating surface of the head portion of the bolt or attached to a washer disposed between the steel plate and the head portion of the bolt, and that has electrical characteristics that vary in response to variation in a force for fastening the bolt to the steel plate.

A loosening detection structure according to an aspect of the present invention is a loosening detection structure used to detect loosening of a bolt, the loosening detection structure including a material that is disposed between a metal inner layer formed in the interior of the bolt and a metal outer layer formed on the exterior of the bolt and has electrical characteristics that vary in response to variation in a force for fastening the bolt to a fixing subject steel plate.

A loosening detection system according to an aspect of the present invention is a loosening detection system including a loosening detection structure used to detect loosening of a bolt and a loosening detection device that detects loosening of the bolt, wherein the loosening detection structure includes either a material that is disposed between a fixing subject steel plate and a head portion of a metal bolt for fixing the steel plate and either attached to a seating surface of the head portion of the bolt or attached to a washer disposed between the steel plate and the head portion of the bolt, and that has electrical characteristics that vary in response to variation in a force for fastening the bolt to the steel plate, or a material that is disposed between a metal inner layer formed in the interior of the bolt and a metal outer layer formed on the exterior of the bolt and has electrical characteristics that vary in response to variation in the force for fastening the bolt to the fixing subject steel plate, and the loosening detection device includes an output unit for outputting an electromagnetic wave that is used to detect loosening of the bolt, an input unit for receiving an electromagnetic wave returning through the material, and a determination unit for comparing a measurement value of the received electromagnetic wave with a measurement value of an electromagnetic wave measured when the bolt is fastened, and determining loosening of the bolt on the basis of whether or not a resonance frequency has shifted or whether or not the resonance frequency is within a predetermined frequency range.

A loosening detection method according to an aspect of the present invention is a loosening detection method for detecting loosening of a bolt using a loosening detection structure used to detect loosening of the bolt, wherein the loosening detection structure includes either a material that is disposed between a fixing subject steel plate and a head portion of a metal bolt for fixing the steel plate and either attached to a seating surface of the head portion of the bolt or attached to a washer disposed between the steel plate and the head portion of the bolt, and that has electrical characteristics that vary in response to variation in a force for fastening the bolt to the steel plate, or a material that is disposed between a metal inner layer formed in the interior of the bolt and a metal outer layer formed on the exterior of the bolt and has electrical characteristics that vary in response to variation in the force for fastening the bolt to the fixing subject steel plate, and the loosening detection device includes a step for outputting an electromagnetic wave that is used to detect loosening of the bolt, a step for receiving an electromagnetic wave returning through the material, and a step for comparing a measurement value of the received electromagnetic wave with a measurement value of an electromagnetic wave measured when the bolt is fastened, and determining loosening of the bolt on the basis of whether or not a resonance frequency has shifted or whether or not the resonance frequency is within a predetermined frequency range.

Effects of the Invention

According to the present invention, it is possible to provide a technique with which loosening of a bolt can easily be detected.

DESCRIPTION OF EMBODIMENTS

Embodiments of the present invention will be described below with reference to the figures. In the figures, identical parts have been allocated identical reference symbols, and description thereof has been omitted.

OUTLINE OF INVENTION

The present invention provides a technique with which loosening of a bolt can easily be detected, and for this purpose, a seating surface or the like on a head portion of the bolt is finely engineered using a hygroscopic resin material or the like. When the bolt loosens, the hygroscopic resin material or the like continues to take in moisture from the air. Hence, loosening of the bolt is determined by detecting variation occurring as a result in the relative permittivity of the hygroscopic resin material or the like using electromagnetic waves such as microwaves.

First Embodiment

Configuration of Loosening Detection Structure

Figure 1A:
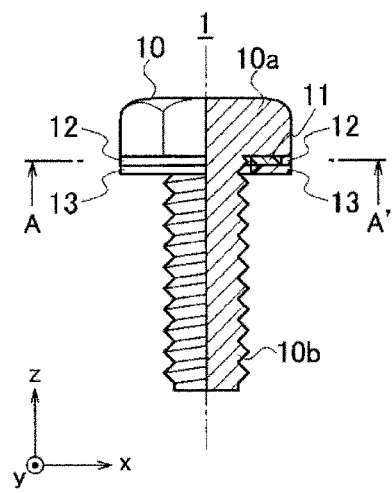
FIG. 1 is a view showing a configuration of a loosening detection structure according to a first embodiment.
Figure 1B:
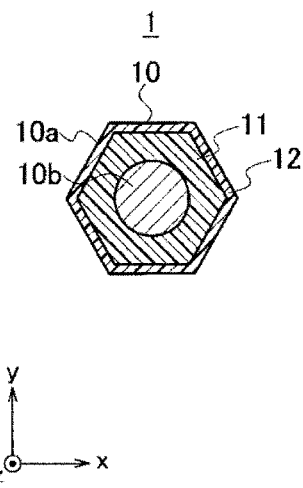

FIG. 1 is a view showing a configuration of a loosening detection structure 1 according to a first embodiment. FIG. 1(a) is a side view and a partial sectional view of the loosening detection structure 1. FIG. 1(b) is a sectional view of the loosening detection structure 1 taken along an A-A' line in FIG. 1(a).

The loosening detection structure 1 includes a loosening detection structure used to detect loosening of a bolt fixing a fixing subject steel plate. For example, the loosening detection structure 1 includes a metal bolt 10, a hygroscopic resin material 11, a first sealing material 12, and a second sealing material 13.

The metal bolt 10 includes a head portion 10a that is used to rotate the bolt 10 about a trunk portion 10b, and the trunk portion 10b, on which a screw thread is formed. The bolt 10 can be realized by a commercially available, general-purpose bolt, for example.

The hygroscopic resin material (the hygroscopic material hereafter) 11 is disposed between the fixing subject steel plate and the head portion 10a of the bolt 10 fixing the steel plate. The hygroscopic material 11 is attached by an adhesive or the like to substantially the entirety of a seating surface (the surface on the side of the trunk portion 10b) of the head portion 10a of the bolt 10 and thereby incorporated integrally into the bolt 10 as a part of the bolt 10. The hygroscopic material 11 is a material having electrical characteristics that vary in response to variation in the force for fastening the bolt 10 to the steel plate. For example, the hygroscopic material 11 is a hygroscopic resin material that takes in moisture from the air through an exposed surface in response to a reduction in the force for fastening the bolt 10. The hygroscopic material 11 can be realized using a polyacrylate-based, polysulfonate-based, maleic anhydride-based, polyacrylamide-based, polyvinyl alcohol-based, polyethylene oxide-based, or polyamine-based material, or the like, for example.

The first sealing material 12 is disposed on (attached to, charged onto) a side surface of the hygroscopic material 11 so that the side surface of the hygroscopic material 11 is not exposed, or in other words, as shown in FIG. 1(b), so as to surround the entire side surface of the hygroscopic material 11 and cover the entire side surface of the hygroscopic material 11. The first sealing material 12 can be realized by a commercially available, general-purpose sealing material, for example.

The second sealing material 13 is disposed on (attached to, charged onto) a lower surface (the surface on the side that does not contact the seating surface of the head portion 10a of the bolt 10) of the hygroscopic material 11 so that the lower surface of the hygroscopic material 11 is not exposed, or in other words, as shown in FIG. 1(a), so as to surround the entire lower surface of the hygroscopic material 11 and cover the entire lower surface of the hygroscopic material 11. The second sealing material 13 can be realized by a commercially available, general-purpose sealing material, for example. Note that the second sealing material 13 is used to prevent the hygroscopic material 11 from taking in moisture from the air through the lower surface thereof prior to use of the loosening detection structure 1 (before fastening the bolt 10, before the construction work), and at the start of use of the loosening detection structure 1 (when the bolt 10 is fastened, during the construction work), the second sealing material 13 is peeled away so as to expose the lower surface of the hygroscopic material 11.

Configuration of Loosening Detection Device

Figure 2:
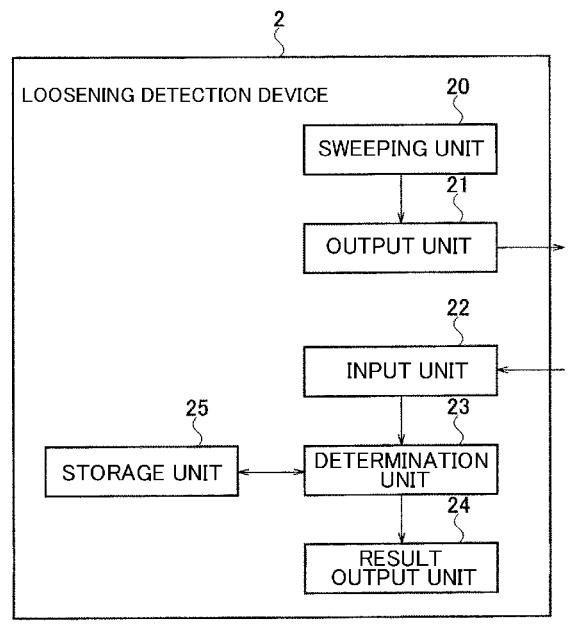
FIG. 2 is a view showing a configuration of a loosening detection device according to the first embodiment.

FIG. 2 is a view showing a configuration of a loosening detection device 2 according to the first embodiment. The loosening detection device 2 is a loosening detection for detecting loosening of a bolt. The loosening detection device 2 includes a sweeping unit 20, an output unit 21, an input unit 22, a determination unit 23, a result output unit 24, and a storage unit 25.

The sweeping unit 20 is a function unit for sweeping frequencies within a predetermined range.

The output unit 21 is a function unit for generating an electromagnetic wave that has a frequency swept by the sweeping unit 20 and is used to detect loosening of the bolt 10, and outputting the electromagnetic wave to the loosening detection structure 1. For example, the output unit 21 generates an electromagnetic wave in a high frequency band (a high-frequency signal), such as a microwave, and propagates the electromagnetic wave to the head portion 10a of the bolt 10.

The input unit 22 has a function for receiving the electromagnetic wave that is output to the loosening detection structure 1 from the output unit 21 and returns from the loosening detection structure 1. For example, the input unit 22 receives an electromagnetic wave returning via the hygroscopic material 11 through the fixing subject steel plate.

The determination unit 23 is a function unit for reading a measurement value of an electromagnetic wave measured at the start of use of the loosening detection structure 1 (when the bolt 10 is fastened, during the construction work) from the storage unit 25, comparing the measurement value of the electromagnetic wave input therein from the input unit 22 with the measurement value of the electromagnetic wave measured at the start of use, and determining loosening of the bolt 10 on the basis of whether or not a resonance frequency has shifted or whether or not the resonance frequency is within a predetermined frequency range.

The result output unit 24 is a function unit for outputting the result of the determination performed by the determination unit 23 in relation to loosening of the bolt 10 to a display, a printing device, or the like.

The storage unit 25 has a function for storing the measurement value of the electromagnetic wave measured at the start of use of the loosening detection structure 1 (when the bolt 10 is fastened, during the construction work) readably in association with a measurement time. The storage unit 25 has a function for storing the measurement value of the electromagnetic wave input therein from the input unit 22 readably in association with a measurement time.

The sweeping unit 20, the output unit 21, and the input unit 22 configured as described above can be realized by, for example, an electromagnetic wave control device, an electromagnetic wave control circuit, or the like that is caused to generate, input, and output electromagnetic waves. The determination unit 23, the result output unit 24, and the storage unit 25 can be realized by a computer having a CPU, a memory, and so on.

Configuration of Loosening Detection System

Figure 3:
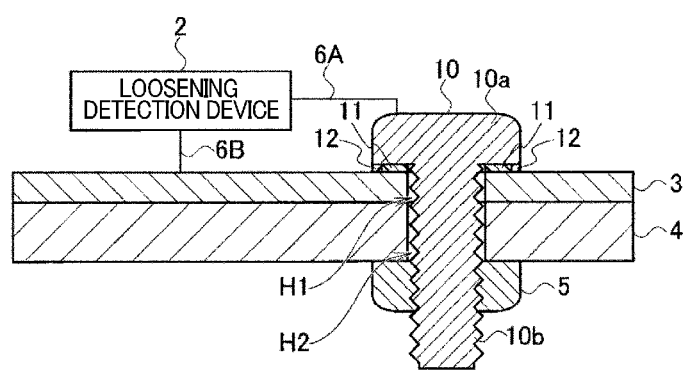
FIG. 3 is a view showing a configuration of a loosening detection system according to the first embodiment.

FIG. 3 is a view showing a configuration of a loosening detection system according to the first embodiment. The loosening detection system is formed by combining the loosening detection structure 1 shown in FIG. 1 with the loosening detection device 2 shown in FIG. 2.

During construction work for fixing the fixing subject steel plate using the bolt 10, a user exposes the lower surface of the hygroscopic material 11 by peeling away the second sealing material 13. The user then overlaps a first steel plate 3 and a second steel plate 4 serving as fixing subjects, passes the trunk portion 10b of the bolt 10 through fixing holes H1 and H2 provided respectively therein, and rotates either the head portion 10a of the bolt 10 or a nut 5 in order to fix the first steel plate 3 and the second steel plate 4. Thus, the lower surface of the hygroscopic material 11 is returned to an unexposed state during the construction work. The side surface of the hygroscopic material 11 is also set in an unexposed state by the first sealing material 12.

Figure 4:
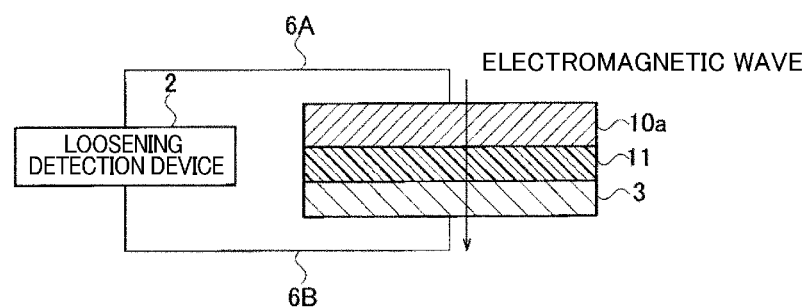
FIG. 4 is a view showing an electrical circuit formed in the first embodiment.

Next, the user connects the loosening detection device 2 to the head portion 10a of the bolt 10 by a first transmission line 6A and connects the loosening detection device 2 to the first steel plate 3 by a second transmission line 6B. As a result, as shown in FIG. 4, a single electrical circuit capable of propagating electromagnetic waves is formed by the loosening detection device 2, the first transmission line 6A, the head portion 10a of the bolt 10, the hygroscopic material 11, the first steel plate 3, and the second transmission line 6B.

Operation of Loosening Detection Device

Figure 5:
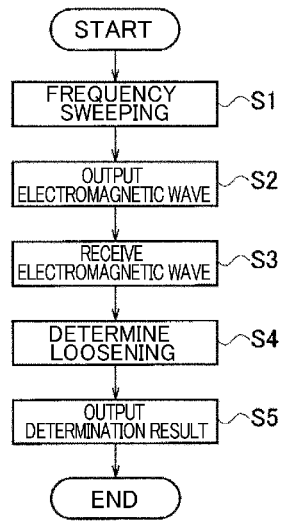
FIG. 5 is a view showing an operation flow of a loosening detection method according to the first embodiment.

FIG. 5 is a view showing an operation flow of a method for detecting loosening using the loosening detection device 2 according to the first embodiment.

Step S1:
First, the sweeping unit 20 sweeps frequencies within a predetermined range.

Step S2:
Next, the output unit 21 generates an electromagnetic wave (a microwave or the like) that has a frequency swept by the sweeping unit 20 and propagates the electromagnetic wave to the head portion 10a of the bolt 10 over the first transmission line 6A. Accordingly, the electromagnetic wave successively propagates through the head portion 10a of the bolt 10, the hygroscopic material 11, and the first steel plate 3 in that order.

Step S3:
Next, the input unit 22 receives the electromagnetic wave returning from the first steel plate 3 over the second transmission line 6B.

Step S4:
Next, the determination unit 23 reads the measurement value of the electromagnetic wave measured during the construction work from the storage unit 25, compares the measurement value of the electromagnetic wave input therein in step S3 with the measurement value of the electromagnetic wave measured during the construction work, and determines loosening of the bolt 10 on the basis of whether or not the resonance frequency has shifted or whether or not the resonance frequency is within a predetermined frequency range.

Step S5:
Finally, the result output unit 24 outputs the determination result of step S4 to a screen of the display.

Figure 6:
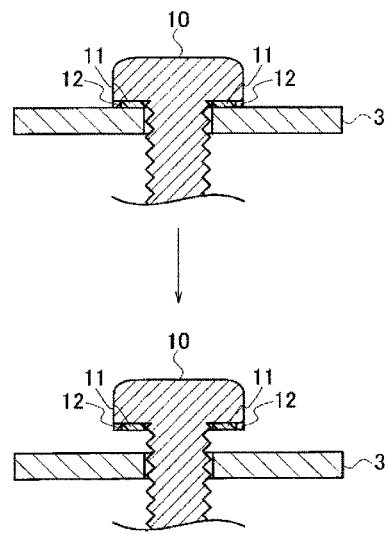
FIG. 6 is a view showing state transitions of a bolt over time.

As shown on the upper side of FIG. 6, during the construction work for fastening the bolt 10, the lower surface of the hygroscopic material 11 contacts the upper surface of the first steel plate 3 so as to be covered by the first steel plate 3 and is therefore in an unexposed state. However, when loosening occurs in the bolt 10 over time, the lower surface of the hygroscopic material 11 separates from the first steel plate 3, as shown on the lower side of FIG. 6, so as to change to an exposed state.

Thus, the lower surface of the hygroscopic material 11 comes into contact with air such that the hygroscopic material 11 absorbs moisture in the air and rain through the exposed lower surface. As a result, either the relative permittivity of the hygroscopic material 11 varies or the hygroscopic material 11 expands. Hence, the loosening detection device 2 propagates an electromagnetic wave such as a microwave through the hygroscopic material 11 and detects a shift (a peak shift) in the resonance frequency caused by the difference in the relative permittivity of the hygroscopic material 11. More specifically, when the hygroscopic material 11 absorbs moisture, the relative permittivity thereof increases such that the effective wavelength of the propagated electromagnetic wave shortens, and as a result, the resonance frequency shifts to the short wavelength side. The loosening detection device 2 detects this shift in the resonance frequency.

Figure 7:
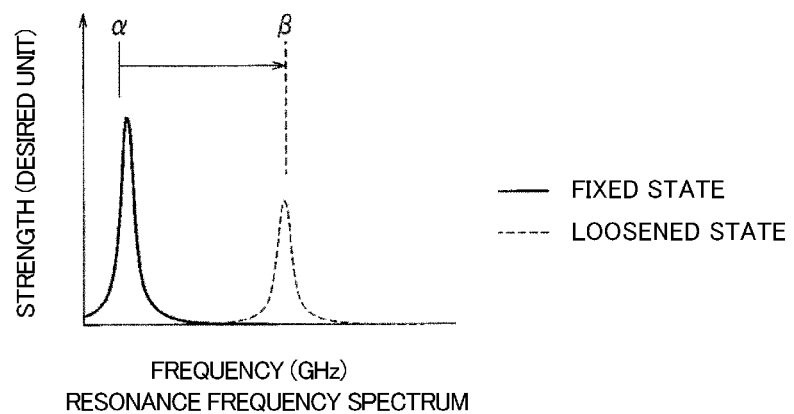
FIG. 7 is a view showing an example of a method for determining loosening of the bolt.
Figure 8:
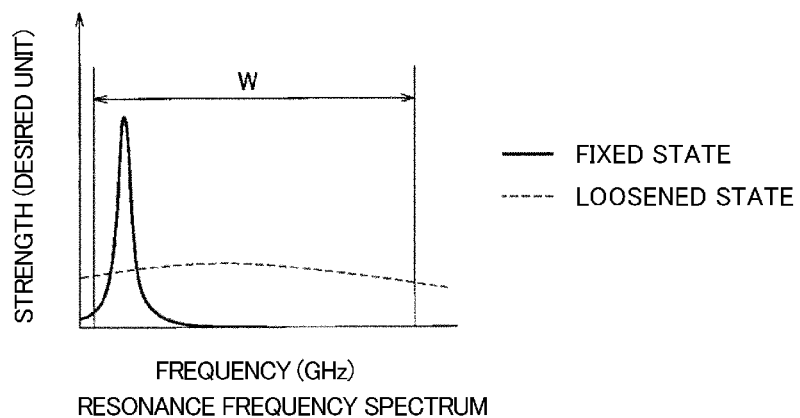
FIG. 8 is a view showing an example of a method for determining loosening of the bolt.

For example, as shown in FIG. 7, the loosening detection device 2 detects loosening of the bolt 10 according to whether or not a resonance frequency α of the electromagnetic wave during the construction work has shifted to β at a predetermined timing following the construction work. Alternatively, as shown in FIG. 8, the loosening detection device 2 detects loosening of the bolt 10 by observing whether or not the resonance frequency is within a range W serving as a predetermined observation frequency range. These two methods may be combined.

Modified Example of First Sealing Material 12

In this embodiment, a case in which the first sealing material 12 is disposed on the side surface of the hygroscopic material 11 was described. However, when the bolt 10 is fastened, the thickness of the hygroscopic material 11 becomes extremely thin, and therefore the amount of moisture taken in through the side surface of the hygroscopic material 11 is extremely small in comparison with the amount of moisture taken in through the lower surface of the hygroscopic material 11. Hence, if the measurement value at the point where an extremely small amount of moisture has been taken in through the side surface of the hygroscopic material is defined as the measurement value measured during the construction work, the first sealing material 12 does not necessarily have to be used.

Modified Example 1 of Hygroscopic Material 11

In the description of this embodiment, the hygroscopic material 11 was used as an example. However, a material other than the hygroscopic material 11 may be used as long as the material has electrical characteristics that vary in response to variation in the force for fastening the bolt 10 to the steel plate. For example, an insulator such as a piezoelectric or a ferroelectric that conducts electricity when pressure is applied thereto is disposed on the seating surface of the head portion 10a of the bolt 10 instead of the hygroscopic material 11. The ferroelectric can be realized using a relaxor ferroelectric as a material, for example.

When the bolt 10 is fastened, pressure is applied between the head portion 10a of the bolt 10 and the first steel plate 3, and therefore the relative permittivity of the insulator is low. When the bolt 10 loosens, on the other hand, the pressure applied thereto decreases, leading to an increase in the relative permittivity of the insulator. Hence, an electromagnetic wave such as a microwave is propagated, and the existence of a shift in the resonance frequency caused by the difference in the relative permittivity of the insulator or the like is detected.

Modified Example 2 of Hygroscopic Material 11

In the description of this embodiment, the hygroscopic material 11 was used as an example. However, a material other than the hygroscopic material 11 may be used as long as the material has electrical characteristics that vary in response to variation in the force for fastening the bolt 10 to the steel plate. For example, an insulator such as a Mott insulator, the electrical resistance of which decreases in response to pressure, is disposed on the seating surface of the head portion 10a of the bolt 10 instead of the hygroscopic material 11. The Mott insulator can be realized using a material such as $ReNiO_3$, for example.

When the bolt 10 is fastened, pressure is applied between the head portion 10a of the bolt 10 and the first steel plate 3, and therefore the electrical resistance of the insulator is low, resulting in a shorted state (a short-circuited state). When the bolt 10 loosens, on the other hand, the pressure applied thereto decreases, leading to an increase in the electrical resistance of the insulator, and as a result, the insulator enters an open state (a non-short-circuited state). In other words, the relative permittivity of the insulator changes. Hence, the loosening detection device 2 propagates an electromagnetic wave such as a microwave and detects a shift in the resonance frequency caused by the difference in the relative permittivity of the insulator or the like.

Second Embodiment

Configuration of Loosening Detection Structure

Figure 9:
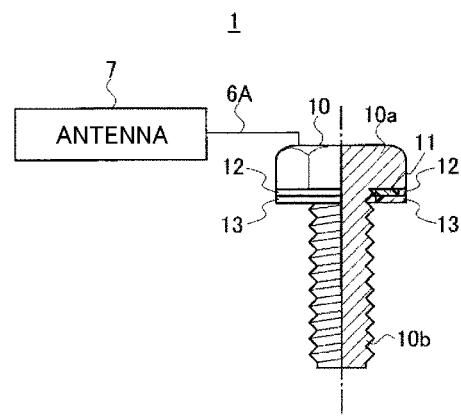
FIG. 9 is a view showing a configuration of a loosening detection structure according to a second embodiment.

FIG. 9 is a view showing a configuration of the loosening detection structure 1 according to a second embodiment. In the loosening detection structure 1 according to the second embodiment, an antenna 7 is added to the loosening detection structure 1 described in the first embodiment. The antenna 7 is connected to the head portion 10a of the bolt 10 using the first transmission line 6A. The antenna 7 has functions for wirelessly receiving the electromagnetic wave used to detect loosening of the bolt 10 and wirelessly transmitting the electromagnetic wave that passes through the hygroscopic material 11. The antenna 7 can be realized by a commercially available, general-purpose antenna rod, for example. If necessary, a transmission/reception circuit for wirelessly transmitting and receiving the electromagnetic waves can also be provided. The configuration of the loosening detection structure 1 other than the antenna 7 and the transmission/reception circuit is similar to the configuration of the loosening detection structure 1 described in the first embodiment.

Configurations of Loosening Detection Device and Loosening Detection System

Figure 10:
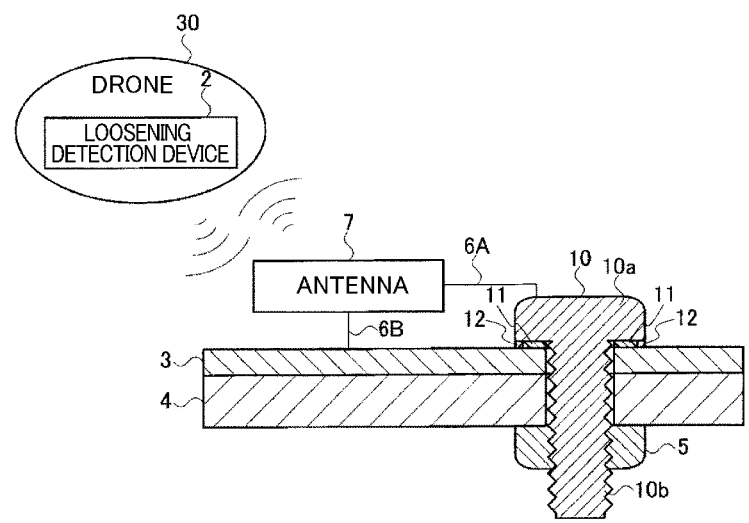
FIG. 10 is a view showing a configuration of a loosening detection system according to the second embodiment.

FIG. 10 is a view showing a configuration of a loosening detection system according to the second embodiment. The loosening detection device 2 according to the second embodiment is disposed in the interior of a drone 30, which is an unmanned aircraft or an unmanned flying vehicle. An antenna for wirelessly transmitting the electromagnetic wave used to detect loosening of the bolt 10 to the loosening detection structure 1 and wirelessly receiving the electromagnetic wave returning from the loosening detection structure 1 is added to the loosening detection device according to the second embodiment. If necessary, a transmission/reception circuit for wirelessly transmitting and receiving the electromagnetic waves may also be provided. The antenna and the transmission/reception circuit can be realized by a commercially available, general-purpose antenna rod and a commercially available, general-purpose wireless transmission/reception circuit, for example. The configuration of the loosening detection device 2 other than the antenna and the transmission/reception circuit is similar to the configuration of the loosening detection device 2 described in the first embodiment. Note that the antenna 7 added to the loosening detection structure 1 is connected to the head portion 10a of the bolt 10 using the first transmission line 6A and also connected to the first steel plate 3 using the second transmission line 6B.

Operation of Loosening Detection Device

In an operation of the loosening detection device 2 according to the second embodiment, the loosening detection device and the loosening detection structure 1 exchange the electromagnetic waves wirelessly. Otherwise, the operation is similar to the operation described in the first embodiment.

Modified Example of Drone 30

In this embodiment, a case in which the loosening detection device 2 is disposed in the interior of the drone 30 was described. Instead of the drone 30, the loosening detection device 2 may be installed in an external medium such as a moving inspection vehicle, for example.

Third Embodiment

Configuration of Loosening Detection Structure

Figure 11A:
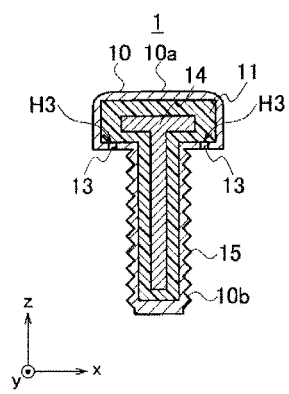
FIG. 11 is a view showing a configuration of a loosening detection structure according to a third embodiment.
Figure 11B:
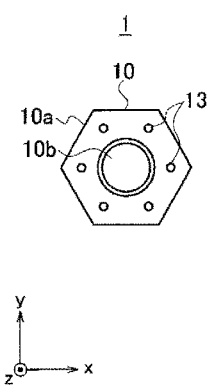

FIG. 11 is a view showing a configuration of the loosening detection structure 1 according to a third embodiment. FIG. 11(a) is a side view and a sectional view of the loosening detection structure 1. FIG. 1(b) is a bottom view of FIG. 1(a).

The loosening detection structure 1 includes a loosening detection structure used to detect loosening of a bolt for fixing a fixing subject steel plate. For example, the loosening detection structure 1 includes the metal bolt 10.

Similarly to the first embodiment, the metal bolt 10 includes the head portion 10a for rotating the bolt 10 about the trunk portion 10b, and the trunk portion 10b, on which a screw thread is formed. The bolt 10 can be realized by a commercially available, general-purpose bolt, for example.

In the third embodiment, the bolt 10 is constituted by a metal inner layer 14, the hygroscopic material 11, a metal outer layer 15, and the second sealing material 13.

The inner layer 14 is formed in the interior of the bolt 10. The inner layer 14 can be realized by pouring a metallic material into a T-shaped die, for example.

The hygroscopic material 11 is disposed in a hollow region between the inner layer 14 of the bolt 10 and the outer layer 15 of the bolt 10. The hygroscopic material 11 is hermetically sealed in the hollow region by the inner layer 14 of the bolt 10 and the outer layer 15 of the bolt 10 and thereby incorporated integrally into the bolt 10 as a part of the bolt 10. The hygroscopic material 11 is a material having electrical characteristics that vary in response to variation in the force for fastening the bolt 10 to the steel plate. For example, similarly to the first embodiment, the hygroscopic material 11 is a hygroscopic resin material that takes in moisture from the air through an exposed surface in response to a reduction in the force for fastening the bolt 10. The hygroscopic material 11 can be realized using a polyacrylate-based, polysulfonate-based, maleic anhydride-based, polyacrylamide-based, polyvinyl alcohol-based, polyethylene oxide-based, or polyamine-based material, or the like, for example.

The outer layer 15 forms the exterior of the bolt 10. A plurality of air holes H3 through which air passes so as to be input are formed in the outer layer 15 in locations forming the seating surface of the head portion 10a of the bolt 10. The outer layer 15 can be realized by pouring a metallic material into a bolt-shaped die.

The second sealing material 13 is disposed in (attached to, charged into) the interior of the plurality of air holes H3 so that the hygroscopic material 11 disposed in the interior of the bolt 10 is not exposed. The second sealing material 13 can be realized by a commercially available, general-purpose sealing material, for example. Note that the second sealing material 13 is used to prevent the hygroscopic material 11 from taking in moisture from the air through the air holes H3 prior to use of the loosening detection structure 1 (before fastening the bolt 10, before the construction work), and at the start of use of the loosening detection structure 1 (when the bolt 10 is fastened, during the construction work), the second sealing material 13 is removed so as to expose the hygroscopic material 11 inside the bolt 10.

Configuration of Loosening Detection Device

The configuration of the loosening detection device 2 according to the third embodiment is similar to the configuration of the loosening detection device 2 according to the first embodiment.

Configuration of Loosening Detection System

Figure 12:
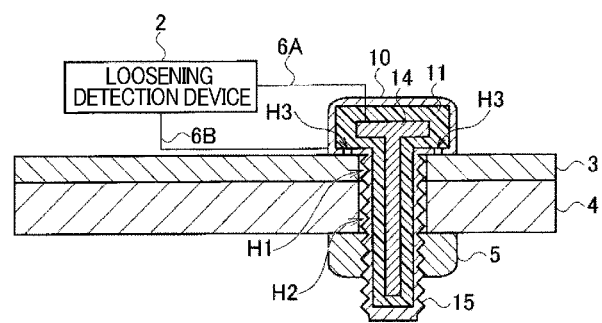
FIG. 12 is a view showing a configuration of a loosening detection system according to the third embodiment.

FIG. 12 is a view showing a configuration of a loosening detection system according to the third embodiment.

During the construction work for fixing the fixing subject steel plate using the bolt 10, the user removes the second sealing material 13 so as to expose the hygroscopic material 11 inside the bolt 10. The user then overlaps the first steel plate 3 and the second steel plate 4 serving as the fixing subjects, passes the trunk portion 10b of the bolt 10 through the fixing holes H1 and H2 provided respectively therein, and rotates either the head portion 10a of the bolt 10 or the nut 5 in order to fix the first steel plate 3 and the second steel plate 4. Thus, the hygroscopic material 11 is returned to an unexposed state during the construction work.

Figure 13:
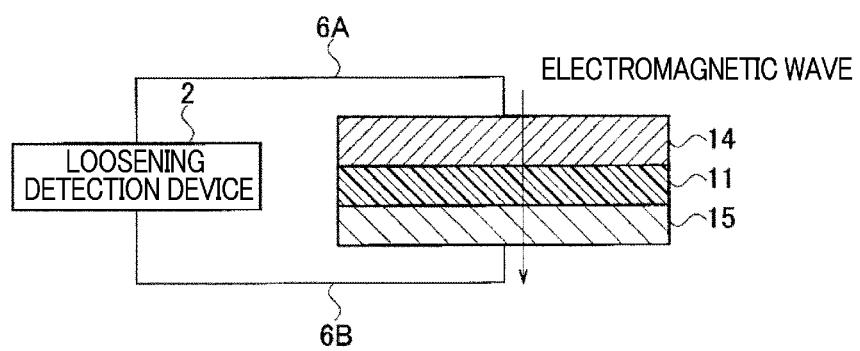
FIG. 13 is a view showing an electrical circuit formed in the third embodiment.

Next, the user connects the loosening detection device 2 to the inner layer 14 of the bolt 10 by the first transmission line 6A and connects the loosening detection device 2 to the outer layer 15 of the bolt 10 by the second transmission line 6B. As a result, as shown in FIG. 13, a single electrical circuit capable of propagating electromagnetic waves is formed by the loosening detection device 2, the first transmission line 6A, the inner layer 14 of the bolt 10, the hygroscopic material 11, the outer layer 15 of the bolt 10, and the second transmission line 6B.

Operation of Loosening Detection Device

During the construction work for fastening the bolt 10, the air holes H3 are blocked by the first steel plate 3, and therefore the hygroscopic material 11 inside the bolt 10 is in an unexposed state. However, when loosening occurs in the bolt 10 over time, the air holes H3 separate from the first steel plate 3, and as a result, the hygroscopic material 11 changes to a state of being exposed through the air holes H3.

Hence, the hygroscopic material 11 comes into contact with air, and therefore the hygroscopic material 11 absorbs moisture in the air and rain through the exposed surface thereof. As a result, the hygroscopic material 11 expands such that the relative permittivity of the hygroscopic material 11 changes. The surface of the head portion 10a of the bolt 10 is thus grounded, whereupon the loosening detection device 2 induces a voltage between itself and the hygroscopic material 11 embedded in the bolt 10 and observes the frequency characteristic of the electromagnetic wave propagating through the hygroscopic material 11. The loosening detection device 2 then determines whether or not the bolt 10 has loosened, leading to variation in the relative permittivity of the hygroscopic material 11, according to whether or not the resonance frequency has shifted or whether or not the resonance frequency is in the observation frequency range.

The specific operation of the loosening detection device 2 according to the third embodiment is similar to the operation described in the first embodiment.

Modified Example 1 of Hygroscopic Material 11

Similarly to the first embodiment, an insulator such as a piezoelectric or a ferroelectric, for example, that conducts electricity when pressure is applied thereto may be disposed (embedded) in the bolt 10 instead of the hygroscopic material 11. When the bolt 10 loosens, the pressure on the insulator varies, leading to variation in the relative permittivity of the insulator. Hence, the loosening detection device 2 propagates an electromagnetic wave such as a microwave and detects a shift in the resonance frequency caused by the difference in the relative permittivity of the insulator or the like. Note that when an insulator of this type is used, the determination is made on the basis of the pressure on the insulator, and in contrast to the hygroscopic material 11, the intake of moisture from the air is not used as a determination element. Therefore, the air holes H3 need not be provided.

Modified Example 2 of Hygroscopic Material 11

Similarly to the first embodiment, an insulator such as a Mott insulator, for example, the electrical resistance of which decreases in response to pressure, may be disposed (embedded) in the bolt 10 instead of the hygroscopic material 11. When the bolt 10 loosens, the pressure applied to the insulator varies, leading to variation in the relative permittivity of the insulator. Hence, the loosening detection device 2 propagates an electromagnetic wave such as a microwave and detects a shift in the resonance frequency caused by the difference in the relative permittivity of the insulator or the like. Note that when an insulator of this type is used, the determination is made on the basis of the pressure on the insulator, and in contrast to the hygroscopic material 11, the intake of moisture from the air is not used as a determination element. Therefore, the air holes H3 need not be provided.

Fourth Embodiment

Configuration of Loosening Detection Structure

Figure 14:
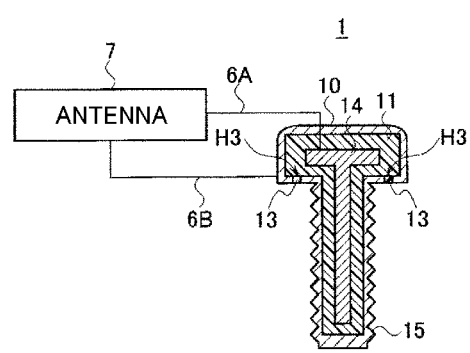
FIG. 14 is a view showing a configuration of a loosening detection structure according to a fourth embodiment.

FIG. 14 is a view showing a configuration of the loosening detection structure 1 according to a fourth embodiment. In the loosening detection structure 1 according to the fourth embodiment, similarly to the second embodiment, the antenna 7 is added to the loosening detection structure 1 described in the third embodiment. The antenna 7 is connected to the inner layer 14 of the bolt 10 using the first transmission line 6A and connected to the outer layer 15 of the bolt 10 using the second transmission line 6B. The antenna 7 can be realized by a commercially available, general-purpose antenna rod, for example. If necessary, a transmission/reception circuit for wirelessly transmitting and receiving the electromagnetic waves can also be provided. The configuration of the loosening detection structure 1 other than the antenna 7 and the transmission/reception circuit is similar to the configuration of the loosening detection structure 1 described in the first embodiment.

Configurations of Loosening Detection Device and Loosening Detection System

Similarly to the second embodiment, the loosening detection device 2 according to the fourth embodiment is disposed in the interior of the drone 30, which is an unmanned aircraft or an unmanned flying vehicle. An antenna for wirelessly transmitting the electromagnetic wave used to detect loosening of the bolt 10 to the loosening detection structure 1 and wirelessly receiving the electromagnetic wave returning from the loosening detection structure 1 is added to the loosening detection device according to the fourth embodiment. If necessary, a transmission/reception circuit for wirelessly transmitting and receiving the electromagnetic waves may also be provided. The antenna and the transmission/reception circuit can be realized by a commercially available, general-purpose antenna rod and a commercially available, general-purpose wireless transmission/reception circuit, for example. The configuration of the loosening detection device 2 other than the antenna and the transmission/reception circuit is similar to the configuration of the loosening detection device 2 described in the first embodiment.

Operation of Loosening Detection Device

In the operation of the loosening detection device 2 according to the fourth embodiment, similarly to the second embodiment, the loosening detection device 2 and the loosening detection structure 1 exchange the electromagnetic waves wirelessly. Otherwise, the operation is similar to the operation described in the first embodiment.

Modified Example of Drone 30

Similarly to the second embodiment, the loosening detection device 2 may be installed in an external medium such as a moving inspection vehicle, for example, instead of the drone 30.

Fifth Embodiment

Configuration of Loosening Detection Structure

In the first to fourth embodiments, cases in which the hygroscopic material 11 used to detect loosening of the bolt is incorporated integrally into the bolt 10 as a part of the bolt 10 were described. In a fifth embodiment, a case in which the hygroscopic material 11 is incorporated integrally into a washer as apart of the washer will be described. The washer is sandwiched between the head portion of the bolt and the steel plate and used to prevent depression and plastic deformation of a workpiece. Since the washer is disposed between the head portion of the bolt and the steel plate, the hygroscopic material 11 is positioned identically to a case in which the hygroscopic material 11 is disposed between the head portion of the bolt and the steel plate. Therefore, similar effects to the effects of the first to fourth embodiments are acquired likewise when the hygroscopic material 11 is incorporated as a part of the washer.

Figure 15A:
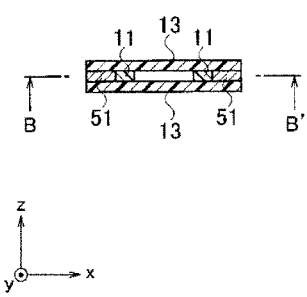
FIG. 15 is a view showing a configuration of a loosening detection structure according to a fifth embodiment.
Figure 15B:
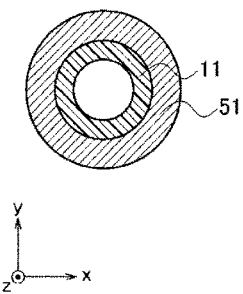

FIG. 15 is a view showing a configuration of the loosening detection structure 1 according to the fifth embodiment. FIG. 15(*a*) is a side view and a partial sectional view of the loosening detection structure 1. FIG. 15(*b*) is a sectional view of the loosening detection structure 1 taken along a B-B' line in FIG. 15(*a*).

The loosening detection structure 1 includes a loosening detection structure used to detect loosening of a bolt for fixing a fixing subject steel plate. For example, the loosening detection structure 1 includes a metal washer 51, the hygroscopic material 11, and the second sealing material 13.

As shown in FIG. 1(*b*), the washer 51 is formed in a donut shape. The diameter of the outside of the washer 51 is larger than the diameter of the head portion 10*a* of the bolt 10. The diameter of the inside of the washer 51 is smaller than the diameter of the head portion 10*a* of the bolt 10. The washer 51 can be realized by a commercially available, general-purpose washer, for example.

As shown in FIG. 1(*b*), the hygroscopic material 11 is formed in a donut shape and disposed on the inside of the washer 51. The hygroscopic material 11 is attached to the inside surface of the washer 51 by an adhesive or the like and thereby incorporated integrally into the washer as a part of the washer. The hygroscopic material 11 is a material having electrical characteristics that vary in response to variation in the force for fastening the bolt 10 to the steel plate. For example, the hygroscopic material 11 is a hygroscopic resin material that takes in moisture from the air through an exposed surface in response to a reduction in the force for fastening the bolt 10. The hygroscopic material 11 can be realized using a polyacrylate-based, polysulfonate-based, maleic anhydride-based, polyacrylamide-based, polyvinyl alcohol-based, polyethylene oxide-based, or polyamine-based material, or the like, for example.

The second sealing material 13 is disposed on (attached to, charged onto) an upper surface and a lower surface of the hygroscopic material 11 so that the upper surface and lower surface of the hygroscopic material 11 are not exposed, or in other words, as shown in FIG. 1(*a*), so as to surround and cover the entire upper surface and the entire lower surface of the hygroscopic material 11. The second sealing material 13 can be realized by a commercially available, general-purpose sealing material, for example. Note that the second sealing material 13 is used to prevent the hygroscopic material 11 from taking in moisture from the air through the upper surface and the lower surface thereof prior to use of the loosening detection structure 1 (before fastening the bolt 10, before the construction work), and at the start of use of the loosening detection structure 1 (when the bolt 10 is fastened, during the construction work), the user peels the second sealing material 13 away so as to expose the upper surface and lower surface of the hygroscopic material 11.

Configuration of Loosening Detection Device

The configuration of the loosening detection device 2 according to the fifth embodiment is similar to the configuration of the loosening detection device 2 according to the first embodiment.

Configuration of Loosening Detection System

Figure 16:
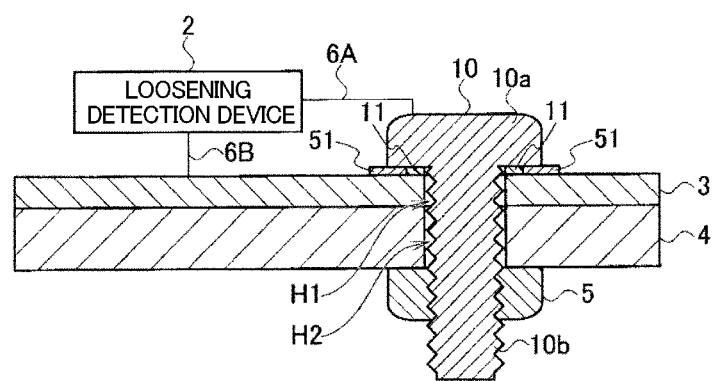
FIG. 16 is a view showing a configuration of a loosening detection system according to the fifth embodiment.

FIG. 16 is a view showing a configuration of a loosening detection system according to the fifth embodiment.

During the construction work for fixing the fixing subject steel plate using the bolt 10, the user removes the second sealing material 13 so as to expose the upper surface and lower surface of the hygroscopic material 11 inside the washer 51. The user then overlaps the first steel plate 3 and the second steel plate 4 serving as the fixing subjects, passes the trunk portion 10*b* of the bolt 10 through the washer 51 and the fixing holes H1 and H2, and rotates either the head portion 10*a* of the bolt 10 or the nut 5 in order to fix the first steel plate 3 and the second steel plate 4. Thus, the hygroscopic material 11 inside the washer 51 is returned to an unexposed state during the construction work.

Next, the user connects the loosening detection device 2 to the head portion 10*a* of the bolt 10 by the first transmission line 6A and connects the loosening detection device 2 to the first steel plate 3 by the second transmission line 6B. As a result, a single electrical circuit capable of propagating electromagnetic waves is formed by the loosening detection device 2, the first transmission line 6A, the head portion 10*a* of the bolt 10, the hygroscopic material 11, the first steel plate 3, and the second transmission line 6B.

Operation of Loosening Detection Device

During the construction work for fastening the bolt 10, the hygroscopic material 11 inside the washer 51 is in an unexposed state. However, when loosening occurs in the bolt 10 over time, the hygroscopic material 11 changes to an exposed state.

Thus, the hygroscopic material 11 comes into contact with air, whereby the hygroscopic material 11 absorbs moisture in the air and rain through the exposed surfaces thereof. As a result, either the relative permittivity of the hygroscopic material 11 varies or the hygroscopic material 11 expands. Hence, the loosening detection device 2 propagates an electromagnetic wave such as a microwave through the hygroscopic material 11 and detects a shift in the resonance frequency caused by the difference in the relative permittivity of the hygroscopic material 11. More specifically, when the hygroscopic material 11 absorbs moisture, the relative permittivity thereof increases such that the effective wavelength of the propagated electromagnetic wave shortens, and as a result, the resonance frequency shifts to the short wavelength side. The loosening detection device 2 detects this shift in the resonance frequency.

Note that the specific operation of the loosening detection device 2 according to the fifth embodiment is similar to the operation described in the first embodiment.

Modified Example 1 of Hygroscopic Material 11

Similarly to the first embodiment, an insulator such as a piezoelectric or a ferroelectric, for example, that conducts electricity when pressure is applied thereto may be disposed (embedded) in the washer 51 instead of the hygroscopic material 11. In this case, the thickness of the insulator is set to be greater than the thickness of the washer 51 so that when the bolt 10 is fastened, pressure is applied to the insulator. When the bolt 10 loosens, the pressure on the insulator varies, leading to variation in the relative permittivity of the insulator. Hence, the loosening detection device 2 propagates an electromagnetic wave such as a microwave and detects a shift in the resonance frequency caused by the difference in the relative permittivity of the insulator or the like.

Modified Example 2 of Hygroscopic Material 11

Similarly to the first embodiment, an insulator such as a Mott insulator, for example, the electrical resistance of which decreases in response to pressure, may be disposed (embedded) in the bolt 10 instead of the hygroscopic material 11. In this case, the thickness of the insulator is set to be greater than the thickness of the washer 51 so that when the bolt 10 is fastened, pressure is applied to the insulator. When the bolt 10 loosens, the pressure on the insulator varies, leading to variation in the relative permittivity of the insulator. Hence, the loosening detection device 2 propagates an electromagnetic wave such as a microwave and detects a shift in the resonance frequency caused by the difference in the relative permittivity of the insulator or the like.

Modified Example of Loosening Detection Structure 1 and Loosening Detection Device 2

Similarly to the second embodiment, an antenna for wirelessly transmitting and receiving the electromagnetic waves and a transmission/reception circuit used to wireless transmit and receive the electromagnetic waves may be added to each of the loosening detection structure 1and the loosening detection device 2.

Other Embodiments

The bolt 10 itself may be formed from a material such as an insulator that conducts electricity when pressure is applied thereto or an insulator having an electrical resistance that decreases in response to pressure. In addition, the configurations of all of the first to fifth embodiments may be combined.

Effects of Embodiments

According to the embodiments described above, the loosening detection structure 1 used to detect loosening of the bolt 10 includes the material 11 that is disposed between the fixing subject steel plate 3 and the head portion 10*a* of the metal bolt 10 for fixing the steel plate 3 and either attached to the seating surface of the head portion 10a of the bolt 10 or attached to the washer 51 disposed between the steel plate 3 and the head portion 10a of the bolt 10, and that has electrical characteristics that vary in response to variation in the force for fastening the bolt 10 to the steel plate 3. Thus, it is possible to provide a technique with which loosening of a bolt can easily be detected. In other words, the material 11 is either attached to the seating surface of the head portion 10a of the bolt 10 or attached to the washer 51 disposed between the steel plate 3 and the head portion 10a of the bolt 10, and thereby incorporated integrally into the bolt 10 or the washer 51 as a part thereof. Hence, the bolt 10 body or the washer 51 body includes the loosening detection structure, and it is therefore unnecessary to go to the trouble of attaching the material 11 used to detect loosening of the bolt during the construction work for fixing the steel plate by fastening the bolt, and sufficient simply to exchange the bolt. As a result, the bolt can be inspected for looseness by means of a simple operation. Further, since a loosened gap part expands due to the expansion of the material 11, the fastening force can be restored by means of a somewhat weak force. Furthermore, during an inspection, the material 11 can be dried so as to remove moisture from the resin of the material 11, whereupon the material 11 can be reused to perform fastening again.

According to the embodiments described above, in the loosening detection structure 1, the material 11 is a hygroscopic resin material that takes in moisture from the air through an exposed surface in response to a reduction in the force for fastening the bolt 10, an insulator that conducts electricity when pressure is applied thereto, or an insulator, the electrical resistance of which decreases in response to pressure. Thus, it is possible to provide a technique with which loosening of a bolt can be detected easily and reliably.

According to the embodiments described above, the loosening detection structure 1 used to detect loosening of a bolt includes the material 11 that is disposed between the metal inner layer 14 formed in the interior of the bolt 10 and the metal outer layer 15 formed on the exterior of the bolt 10 and has electrical characteristics that vary in response to variation in the force for fastening the bolt to the fixing subject steel plate. Thus, it is possible to provide a technique with which loosening of a bolt can easily be detected.

According to the embodiments described above, in the loosening detection structure 1, the material 11 is a hygroscopic resin material that takes in moisture from the air through an exposed surface in response to a reduction in the force for fastening the bolt 10, an insulator that conducts electricity when pressure is applied thereto, or an insulator, the electrical resistance of which decreases in response to pressure, and when the material 11 is a hygroscopic resin material, the air holes H3 that pass air are formed in the outer layer 15, which forms the seating surface of the head portion 10a of the bolt 10. Thus, it is possible to provide a technique with which loosening of a bolt can be detected easily and reliably.

According to the embodiments described above, the loosening detection structure 1 further includes the antenna 7 for wirelessly receiving the electromagnetic wave used to detect loosening of the bolt and wirelessly transmitting the electromagnetic wave that has passed through the material 11. Thus, it is possible to provide a technique with which loosening of a bolt can be detected easily and conveniently. In other words, loosening of the bolt can be inspected easily from a remote location. At this time, it is sufficient simply to connect the antenna 7 to the bolt 10, and therefore the labor involved in connecting the loosening detection device 2 to the fixing subject steel plate 3 can be eliminated. Since it is sufficient simply to fasten the bolt 10, a large number of bolts can easily be inspected for looseness in one go from a remote location.

According to the embodiments described above, in the loosening detection system including the loosening detection structure 1 used to detect loosening of the bolt 10 and the loosening detection device 2 that detects loosening of the bolt 10, the loosening detection structure 1 includes either the material 11 that is disposed between the fixing subject steel plate 3 and the head portion 10a of the metal bolt 10 for fixing the steel plate 3 and either attached to the seating surface of the head portion 10a of the bolt 10 or attached to the washer 51 disposed between the steel plate 3 and the head portion 10a of the bolt 10, and that has electrical characteristics that vary in response to variation in the force for fastening the bolt 10 to the steel plate 3, or the material 11 that is disposed between the metal inner layer 14 formed in the interior of the bolt 10 and the metal outer layer 15 formed on the exterior of the bolt 10 and has electrical characteristics that vary in response to variation in the force for fastening the bolt 10 to the fixing subject steel plate 3, and the loosening detection device 2 includes the output unit 21 for outputting the electromagnetic wave that is used to detect loosening of the bolt 10, the input unit 22 for receiving the electromagnetic wave returning through the material 11, and the determination unit 23 for comparing the measurement value of the received electromagnetic wave with the measurement value of the electromagnetic wave measured when the bolt 10 is fastened, and determining loosening of the bolt 10 on the basis of whether or not the resonance frequency has shifted or whether or not the resonance frequency is within the predetermined frequency range. Thus, it is possible to provide a technique with which loosening of a bolt can easily be detected.

According to the embodiments described above, in a loosening detection method for detecting loosening of a bolt using the loosening detection structure 1 used to detect loosening of the bolt, the loosening detection structure 1 includes either the material 11 that is disposed between the fixing subject steel plate 3 and the head portion 10a of the metal bolt 10 for fixing the steel plate 3 and either attached to the seating surface of the head portion 10a of the bolt 10 or attached to the washer 51 disposed between the steel plate 3 and the head portion 10a of the bolt 10, and that has electrical characteristics that vary in response to variation in the force for fastening the bolt 10 to the steel plate 3, or the material 11 that is disposed between the metal inner layer 14 formed in the interior of the bolt 10 and the metal outer layer 15 formed on the exterior of the bolt 10 and has electrical characteristics that vary in response to variation in the force for fastening the bolt 10 to the fixing subject steel plate 3, and the loosening detection device 2 includes a step for outputting the electromagnetic wave that is used to detect loosening of the bolt 10, a step for receiving the electromagnetic wave returning through the material 11, and a step for comparing the measurement value of the received electromagnetic wave with the measurement value of the electromagnetic wave measured when the bolt 10 is fastened, and determining loosening of the bolt on the basis of whether or not the resonance frequency has shifted or whether or not the resonance frequency is within the predetermined frequency range. Thus, it is possible to provide a technique with which loosening of a bolt can easily be detected.

Miscellaneous

Figure 17:
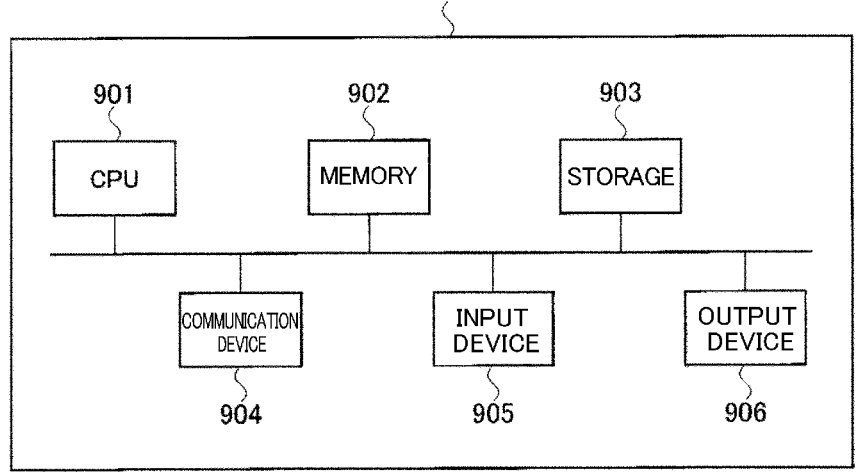
FIG. 17 is a view showing an example of construction of a loosening detection device.

Note that the present invention is not limited to the embodiments described above and may be subjected to various embodiments with the scope of the spirit thereof. As shown in FIG. 17, for example, a general-purpose computer system including a CPU (Central Processing Unit) 901, a memory 902, storage 903 (an HDD: Hard Disk Drive, an SSD: Solid State Drive), a communication device 904, an input device 905, and an output device 906 can be used as the loosening detection device 2 of the embodiments described above. The memory 902 and the storage 903 are storage devices. In this computer system, the respective functions of the loosening detection device 2 are realized by having the CPU 901 execute a predetermined program uploaded to the memory 902.

Note that the loosening detection device 2 may be packaged in either a single computer or a plurality of computers. Alternatively, the loosening detection device 2 may be a virtual machine packaged in a computer.

A program for the loosening detection device 2 maybe stored on a computer-readable recording medium such as an HDD, an SSD, a USB (Universal Serial Bus) memory, a CD (Compact Disc), or a DVD (Digital Versatile Disc) or distributed over a network.

REFERENCE SIGNS LIST

1 Loosening detection structure
10 Bolt
10a Head portion of bolt
10b Trunk portion of bolt
11 Hygroscopic material
12 First sealing material
13 Second sealing material
14 Inner layer of bolt
15 Outer layer of bolt
2 Loosening detection device
20 Sweeping unit
21 Output unit
22 Input unit
23 Determination unit
24 Result output unit
25 Storage unit
3 First steel plate
4 Second steel plate
5 Nut
6A First transmission line
6B Second transmission line
7 Antenna
30 Drone
51 Washer
901 CPU
902 Memory
903 Storage
904 Communication device
905 Input device
906 Output device
H1 Fixing hole of first steel plate
H2 Fixing hole of second steel plate
H3 Air hole in outer layer of bolt

The invention claimed is:

1. A loosening detection structure used to detect loosening of a bolt, comprising:
a material that is disposed between a fixing subject steel plate and a head portion of a metal bolt for fixing the steel plate and either attached to a seating surface of the head portion of the bolt or attached to a washer disposed between the steel plate and the head portion of the bolt, and that has electrical characteristics that vary in response to variation in a force for fastening the bolt to the steel plate; and
an antenna for wireless receiving an electromagnetic wave used to detect loosening of the bolt and wireless transmitting an electromagnetic wave that has passed through the material,
wherein the material is a hygroscopic resin material that takes in moisture from the air through an exposed surface in response to a reduction in the force for fastening the bolt.

2. A loosening detection structure used to detect loosening of a bolt, comprising:
a material that is disposed between a metal inner layer formed in the interior of the bolt and a metal outer layer formed on the exterior of the bolt and has electrical characteristics that vary in response to variation in a force for fastening the bolt to a fixing subject steel plate; and
an antenna for wireless receiving an electromagnetic wave used to detect loosening of the bolt and wireless transmitting an electromagnetic wave that has passed through the material,
wherein the material is a hygroscopic resin material that takes in moisture from the air through an exposed surface in response to a reduction in the force for fastening the bolt.

3. A loosening detection system comprising:
a loosening detection structure used to detect loosening of a bolt and a loosening detection device that detects loosening of the bolt,
wherein the loosening detection structure comprises either a material that is disposed between a fixing subject steel plate and a head portion of a metal bolt for fixing the steel plate and either attached to a seating surface of the head portion of the bolt or attached to a washer disposed between the steel plate and the head portion of the bolt, and that has electrical characteristics that vary in response to variation in a force for fastening the bolt to the steel plate, or a material that is disposed between a metal inner layer formed in the interior of the bolt and a metal outer layer formed on the exterior of the bolt and has electrical characteristics that vary in response to variation in the force for fastening the bolt to the fixing subject steel plate, wherein the material is a hygroscopic resin material that takes in moisture from the air through an exposed surface in response to a reduction in the force for fastening the bolt, and
the loosening detection device comprises:
an output unit for outputting an electromagnetic wave that is used to detect loosening of the bolt;
an input unit for receiving an electromagnetic wave returning through the material; and
a determination unit for comparing a measurement value of the received electromagnetic wave with a measurement value of an electromagnetic wave measured when the bolt is fastened, and determining loosening of the bolt on the basis of whether or not a resonance frequency has shifted or whether or not the resonance frequency is within a predetermined frequency range.

* * * * *